Aug. 27, 1963  D. J. WYROUGH  3,101,967
GUIDES FOR CARGO HOISTING EQUIPMENT
Filed June 16, 1960  4 Sheets-Sheet 1
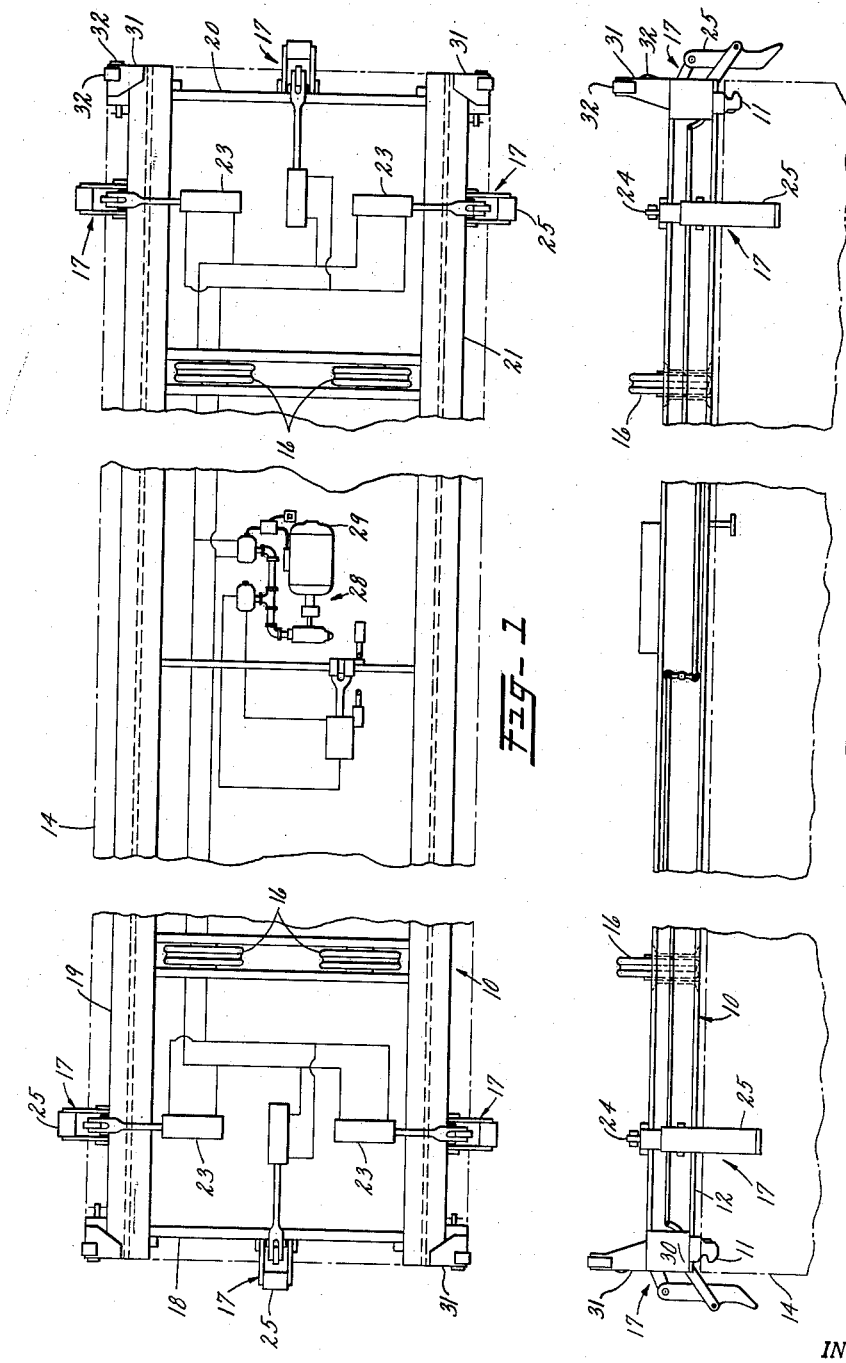
INVENTOR.
David J. Wyrough
BY
Henry Kozak
ATTORNEY Aug. 27, 1963  D. J. WYROUGH  3,101,967
GUIDES FOR CARGO HOISTING EQUIPMENT
Filed June 16, 1960  4 Sheets-Sheet 2
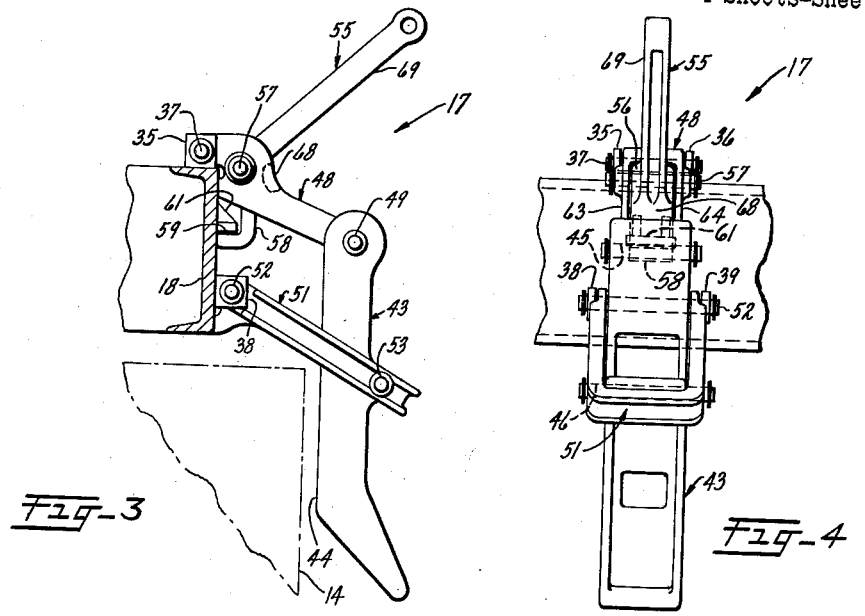
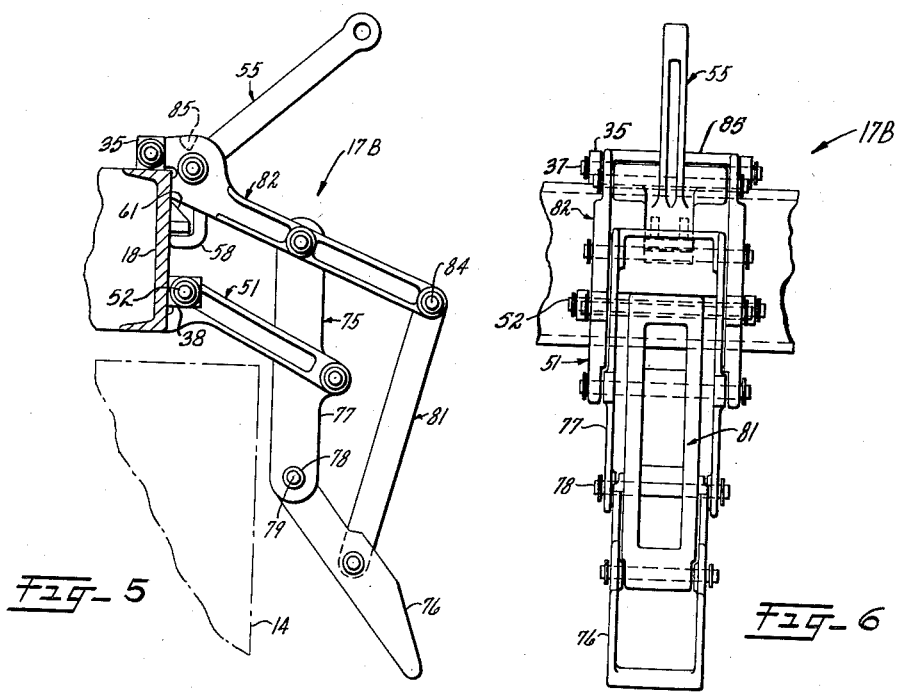
INVENTOR.
David J. Wyrough
BY
Henry Kozak
ATTORNEY

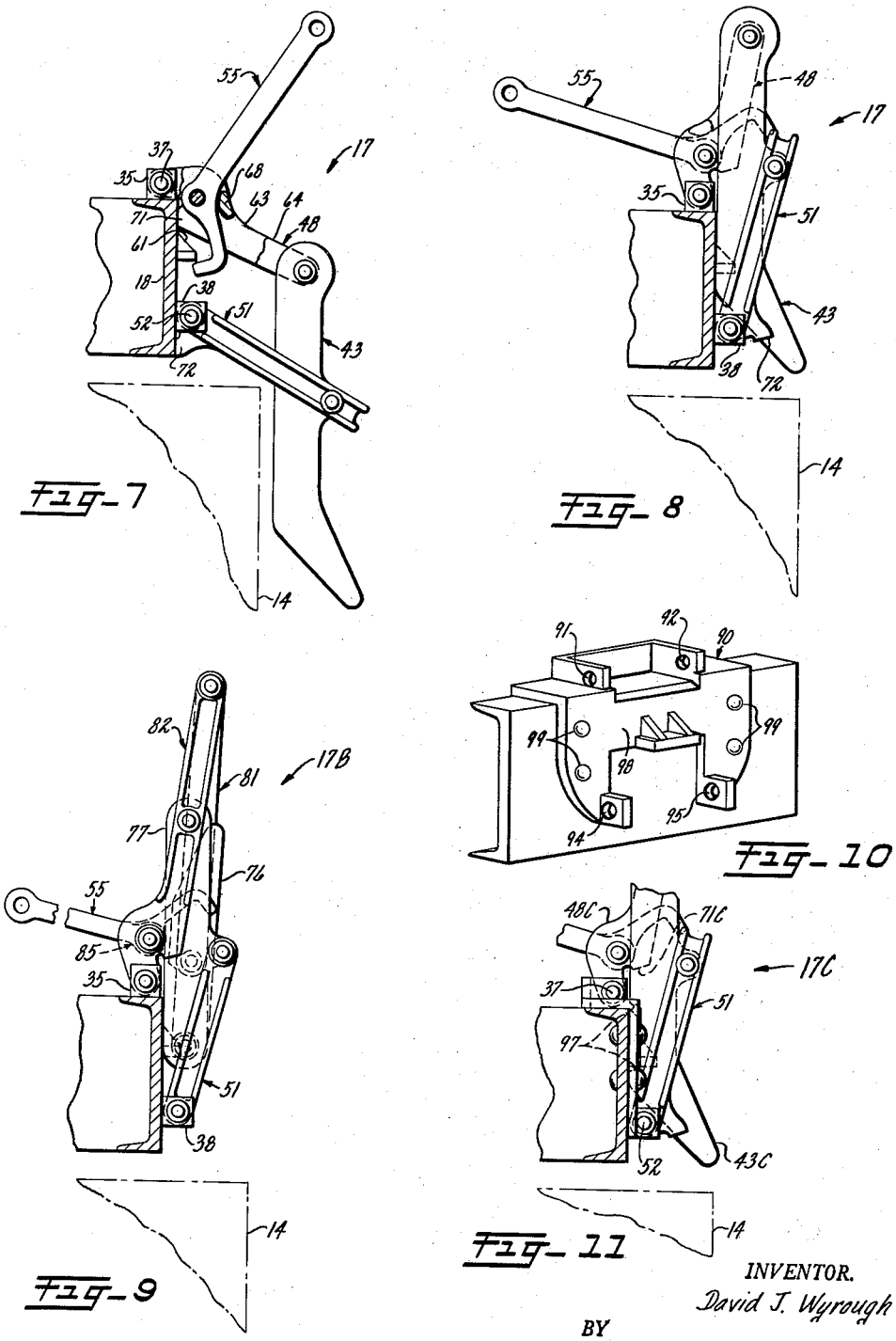

Aug. 27, 1963 D. J. WYROUGH 3,101,967
GUIDES FOR CARGO HOISTING EQUIPMENT
Filed June 16, 1960 4 Sheets-Sheet 4

INVENTOR.
David J. Wyrough
BY
Henry Kozak
ATTORNEY

United States Patent Office 3,101,967
Patented Aug. 27, 1963

3,101,967
GUIDES FOR CARGO HOISTING EQUIPMENT
David J. Wyrough, Maple Heights, Ohio, assignor to National Castings Company, a corporation of Ohio
Filed June 16, 1960, Ser. No. 36,535
18 Claims. (Cl. 294—67)

The present invention relates to a cargo-handling system wherein hoisting equipment and load articles, i.e., cargo containers, have structure cooperating to effect the coupling thereof. Specifically, the invention relates to guides which may be mounted on the implement and, in a lowered position, facilitate the guiding of the hoisting implement into coupled relation with the container, such guides being retractable under certain operating conditions to a position overhead the implement and within the maximum horizontal contour of the container.

A problem arising in the use of a cargo hoisting implement is that of bringing it quickly into superjacent, vertically aligned relation with the container, whereby coupling of the implement and the container can be quickly effected through such manual or automatic coupling facilities as provided. In a highly desirable arrangement, such guides extend downward and outwardly with respect to the implement on which they are mounted to circumscribe an area corresponding to the upper periphery of the container. However, once coupling of the container and the implement has been effected, it is desirable to transfer the guides from any position outside of the vertical projection of the container in order, for example, that the container may be raised and lowered through a hatch opening of a naval vessel without interference of the guides with the ship's structure.

Hence, it is a primary object of this invention to provide guides suitable for use on a cargo hoisting implement to facilitate its coupling with load articles, such as cargo containers, but retractable from operative position into a reduced horizontal area to permit passage of the implement through any openings large enough to receive the article carried by the implement.

A further object is to provide guides in accordance with the foregoing object which utilize simple mechanism and are urged by gravity from a raised position to a lowered position.

Another object is to provide guides for cargo hoisting equipment that are selectively operable.

These and other objects are effectively accomplished through the provision of a retractable guide device utilizing the pantographic principle of operation for retraction and adapted for mounting, preferably in plurality, on a hoisting implement. Such device comprises structure attachable directly to the implement as supporting means for other relatively movable portions of the device, a guide member providing a vertically elongate surface facing a vertical plane extending through the supporting structure for engaging lateral surfaces of a cargo container or other load article, and spaced collateral upper and lower linkages for supporting the member swingably at fixed radii with respect to the supporting structure. Spaced portions of each linkage are pivotally connected with the support and the member along separate pivot axes. The member is thereby swingable on both linkages from a lateral downward position to a laterally retracted overhead position in relation to the support structure and the implement on which the device is mounted.

In the drawing with respect to which the invention is described below in detail:

FIG. 1 is a schematic plan view of a hoisting implement embodying guides in accordance with this invention.

FIG. 2 is a schematic lateral elevation of the implement of FIG. 1.

FIG. 3 is an elevation of a guide device from the implement of FIGS. 1 and 2 as viewed in a direction parallel to pivotal axes thereof.

FIG. 4 is an elevation of the guide of FIG. 3 looking inboardly of the implement mounting the device.

FIG. 5 is an elevation of a modified guide as viewed in a direction parallel to pivotal axes thereof.

FIG. 6 is an elevation of the device of FIG. 5 looking inboardly of the implement on which it is mounted.

FIG. 7 is an elevation of the apparatus of FIGS. 3 and 4 illustrating the operating lever in an unlocking position freeing the device for retraction.

FIG. 8 is an elevation illustrating the device of FIGS. 3, 4, and 7 in completely retracted position.

FIG. 9 is an elevation illustrating the device of FIGS. 5 and 6 in completely retracted position.

FIG. 10 is a perspective view of a support piece of a modified guide device shown in FIG. 11 adapting that device for attachment to a cargo-hoisting implement.

FIG. 11 is an elevation illustrating a modified device utilizing the support piece of FIG. 10 as viewed in a direction parallel to its pivotal axes and in completely retracted position.

Figure 12:
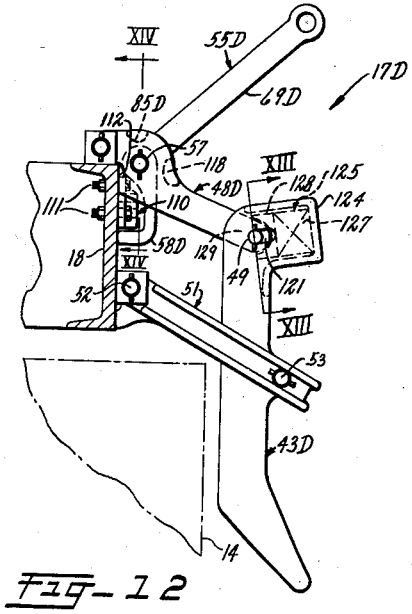
FIG. 12 is an elevation of a modified guide device embodying shock cushioning mechanism as viewed along the pivotal axes thereof.

FIGS. 1 and 2 schematically illustrate a hoisting implement 10 (or "spreader" as known to the trade) of generally rectangular arrangement conforming approximately with the outline of the upper surface of a cargo container 14 which the implement 10 is adapted for lifting from one cargo carrier to another. As shown, the implement 10 comprises couplers 11 at the four corners thereof adapted for interlocking with fittings included in the upper structure of the cargo container 14. Such a container is indicated in FIGS. 1 and 2 in dot-dash outline at approximately the relation with the implement 10 it occupies when coupled therewith. The implement 10 further comprises sheaves 16 by which it is suspended from a crane on cables which may be reeled in or out of cable-storing devices on the crane to raise and lower the implement in load-moving operations.

Considering now the subject matter of the present invention, the implement or spreader 10 further comprises retractable guide devices 17 of which there are shown six mounted on the implement along laterally outward facing surfaces of horizontally-extending peripheral frame members 18, 19, 20, and 21. Each device 17 is actuated by a fluid cylinder 23 having its piston rod connected with a lever 24 of the device for raising and lowering a guide member 25 relatively to the implement 10. As schematically shown, the fluid cylinders are connected with an oil pumping system indicated generally by the numeral 28 activated by an electric motor 29. The cylinders 23 are selectively or collectively controlled in any manner desired by valves, preferably electrically operated, in common use.

In a preferred arrangement, the implement 10 has, when so desired, no portion projecting appreciably beyond the maximum horizontal contour of the container carried thereby in order that the implement may pass without interference vertically through any opening large enough to admit the container. The extreme elongate dimensions of the implement 10 are established by corner sections 30 comprising guide pillars 31 and agree closely with those of the top surface of the container 14, as outlined in dot-dash. However, the guide pillars 31 comprise rollers 32 which project laterally, e.g., ¼ inch beyond the side surfaces of the corner sections for the purpose of engaging vertical guide structure, such as found in naval cargo vessels, in preference to other portions of the implement 10 or the container 14 carried thereby.

In the arrangement illustrated in FIGS. 1 and 2, the guides 17 are retracted, as shown in FIG. 8, inboardly within a rectangular area corresponding to that defined by the outer surfaces of the corner sections 30 or, with reference to the container 14, a horizontal area circumscribed by a vertical projection of the sides of the container usually equivalent to the top surface of the container.

Embodiment A

Embodiment A of this invention is illustrated in FIGS. 3, 4, 7, and 8, i.e., the device 17. It comprises (1) supporting means for the other relatively movable portions of the device, i.e., a pair of upper lugs 35, 36 and a pin 37 extending therethrough, and lower lugs 38 and 39 with a pin 52 extending therethrough; (2) a guide member 43 having a vertically elongate load-engaging surface 44 and vertically spaced pin-receiving bores 45 and 46 disposed along normally horizontal axes; (3) an upper linkage 48 having one end portion in journal relation with the pin 37 received by lugs 35 and 36, and at its other end portion, with a pin 49 extending through the bore 45; (4) a lower linkage 51 having its inboard end portion in journal-relation with a pin 52 extending between and through the lower lugs 38 and 39, and its outboard portion with a pin 53 extending through the bore 46 of the linkage 51; and (5) a lever 55 having its hub portion 56 traversed by a pin 57 supported by opposite end portions in a bore through the linkage 48 along an axis in interjacent and parallel relation with the axes of pins 37 and 49. The lever 55 comprises a hook or latch portion 58 which depends from the hub portion 56 to provide an upwardly facing surface 59 in subjacent relation, at the lower position of the guide, with the downwardly facing surface of a lug 61 welded or otherwise attached to the frame element 18; this element being taken as exemplary of any one of the elements 18 to 21.

As shown, each linkage comprises side links (see side links 63 and 64) rigidly connected by, and integral with, hub portions extending therebetween in sleeve relation with the pins 37 and 49. Linkage 48 further comprises a cross-tie 68 extending between and integrally connected with the links 63 and 64. The cross-tie 68 is disposed between the latch portion and the torque-receiving arm 69 of the lever 55 to act as a stop for relative movement between linkage 48 and the lever in guide raising or lowering operations. In a guide-raising operation, the latch portion 58, in moving out of locking position, first engages the cross-tie, as shown in FIG. 7, before any upward swinging of the assembly comprising the linkages and the member 43 occurs. This free movement of the lever relative to the swingable assembly enables the latch portion 58 to pass in a generally horizontal direction from underneath the lug 61. Within the range of such free movement the latch portion will engage the lug 61 upon slight upward movement of the swingable assembly from its lower position wherein the device provides guidance of the implement relative to the container 14. As further movement of the lever 55 counterclockwise from the position of FIG. 7 is continued, the assembly may be raised to its fully retracted position, as illustrated in FIG. 8, as a result of solid engagement of the latch portion with the cross-tie 68. The device 17 will be held in fully retracted position by the cylinder 23 in a spreader arrangement such as illustrated in FIGS. 1 and 2.

Device 17 as well as the other guide devices illustrated by the drawing are returnable to their lower guiding positions by gravity. When the control system of the implement permits return by gravity, the lever 55 is rotated to a lower position by engagement of the cross-tie 68 with the outboard side of the hook portion 58. When the torque-receiving portion 69 of the lever is relatively long, the lever returns to a locking position underneath the lug 61 through the influence of its own center of gravity. When the lever is connected with a double-acting fluid cylinder, as illustrated, the device is positively carried to its lower locking position. The linkages and the member 43 are in turn forced, in the event of any impediment to such return, through engagement of the outboard side of the lever arm 69 with the cross-tie 68. The swingable assembly of the device is stopped in its lower position by lug portions of the linkages providing surfaces 71 and 72 arranged for engaging the vertical outward-facing surface of the frame elements (18, 19, 20 or 21) to which the device is attached.

In the embodiment illustrated by FIGS. 3, 4, 7, and 8, the various pivotal axes of the linkages are parallel and occur at the corners of a parallelogram in a vertical plane normal to the axes. Hence, the spacing of the axes which extend through the member 43 is equal to the spacing of the two axes extending through the lugs 35, 36, 38, and 39; the spacing of the upper axes, i.e., along pins 37 and 49, is equal to that between the lower axes through pins 52 and 53. To maintain simplicity of the device 17 generally while incorporating therein the system for locking the device in guiding position, the upper axis through the lugs 35, 36, and the upper linkage 48 is offset in an inboard horizontal direction with respect to the lower axis along which the lower linkage is connected with the lugs 38, 39 in order to dispose the axis for the lever 55 through the linkage 48 directly over the lug 61 fixed to the frame element 18. In systems wherein the locking system is desired, such offsetting of the upper axes enables generally more compact design and disposition of the member 43 against the frame element, as shown in FIG. 8, in its retracted position. However, in some installations, particularly wherein the devices are actuated by fluid cylinders, the latter may be used as a hold-down means instead of the locking system just described. In such instances, the lug 59 and latch portion may be eliminated and the lever 55 attached fixedly to linkage 48.

Embodiment B

In Embodiment A the length of the foot section of the guide member 43 is limited by the extent to which the implement or spreader frame is horizontally inset with respect to the periphery of the top surface of the container. Embodiment B, illustrated in FIGS. 5, 6, and 9, avoids this limitation by a guide member 75 having a foot section 76 pivotably connected to an upper section 77 by a pin 78 extending along an axis 79 through a lower portion of section 77 and an upper portion of section 76. Axis 79 is parallel to the various pivotal axes of the linkages. The linkages are connected to the frame element 18 similarly as found in Embodiment A by the pins 37 and 52.

In the guiding posture of device 17B, the pivotal foot section 76 extends, as shown in FIG. 5, downwardly and laterally outwardly from section 77 with respect to a vertical plane extending through a portion of the device fixed to the implement frame 18. In addition to upper section 77, the foot section is further supported by an upper linkage 82 extending outwardly from its point of connection with the upper section 77 and a link 81 connected to this linkage by a pin 84. This pin extends through aligned openings in the laterally outer end portion of the linkages 82 and the upper end portion of the link 81 along an axis parallel to the other pivotal axes of the device 17B.

Device 17B differs further from device 17 in the position of a cross-tie 85 functioning as a stop for the lever 55 when moved relatively to the link 82. The location of this cross-tie in FIG. 5 is such as to permit free movement of the lever 55, resulting in displacement of its hook portion 58 from underneath the lug 61 in the manner shown in FIG. 7 with respect to Embodiment A. Cross-tie 85, while assuring that the lever 55 will function to swing the device 17B from the position of FIG. 5 to the retracted position of FIG. 9, does not operate to positively return the device 17B to its lower position. As illustrated in FIGS. 5 and 9, the device 17B is returned to its lower position by gravity of the assembly comprising the linkages 82 and 51, a guide member 75, and the link 81.

The retracted position of device 17B of FIG. 9 indicates that the mechanism thereof is adaptable for foot sections analogous to section 76 of greater or lesser length without exceeding the horizontal clearance allowed between the outer periphery of the implement frame and the periphery of the container top surface.

*Embodiment C*

FIGS. 10 and 11 illustrate a device similar in operation and function to that of device 17 (Embodiment A) except that it is self-sufficient with respect to supporting means on which the guide member 43C and the linkages 48C and 51 are swingably mounted. Looking particularly at FIG. 10, the device 17C comprises a bracket 90 having upper openings 91 and 92 for receiving the pin 37 by which the upper linkage 48C is attached to the bracket. Lower openings 94 and 95 of the bracket receive the pin 52 by which the linkage 51 is connected pivotally to the bracket. The guide member 43C is notched at 97 to receive the bridge portion 93 of the bracket in the fully retracted position of the device 17C. This device, when fully assembled, is readily attached, as indicated in FIG. 11, to peripheral frame members of a hoisting implement by fasteners such as the rivets 99. In addition to ease of installation, device 17C may be conveniently preassembled and packaged as a unit at the point of manufacture. The linkage 48C differs from its counterpart in device 17 by the location of stop surface 71C.

*Embodiment D*

Figure 13:
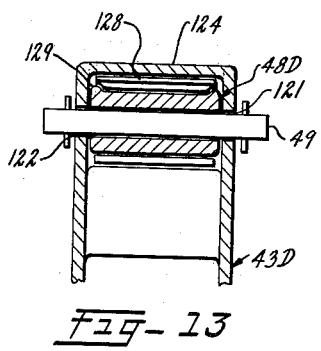
FIG. 13 is a cross-section taken along line XIII—XIII of FIG. 12.
Figure 14:
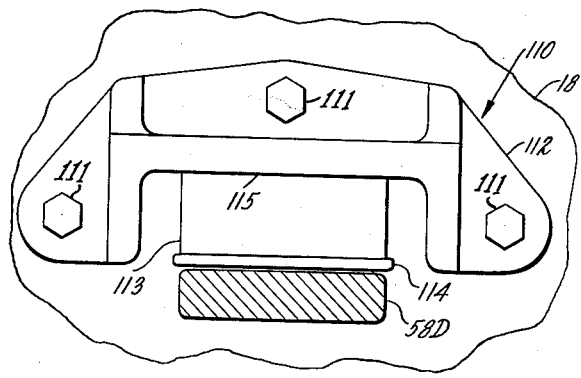
FIG. 14 is a fragmentary elevation illustrating primarily the cushioning stop attachment of FIG. 12 as viewed transversely to the pivotal axes thereof.

As the outer sheeting of cargo containers handled by the equipment herein described is ordinarily of light-gauge metal and rather easily damaged by minor impacts of the guide devices thereagainst, this invention contemplates cushioning mechanism such as that included in a modified guide device 17D illustrated in FIGS. 12 to 14. Device 17D employs some parts which may be identical with those of device 17 of FIGS. 1, 4, and 7. However, it comprises a linkage 48D, a guide member 43D, and a cushioning block 110 of substantially different construction than the counterparts of these elements in device 17. As illustrated, the spatial relationship of the pivotal axes of device 17D is identical with that of device 17.

Cushioning stop 110, for example, has the same general function as the lug 61 of the earlier embodiment. However, the stop 110 has the further function of resiliently resisting upward movement of an underhanging hook portion 58D of the lever 55D. The stop 110 comprises a rigid cleat portion 112, such as a casting, secured by bolts 111 to the frame element 18, a resilient block 113 of rubber or other elastic material, and a pressure plate 114. The resilient block 113 is disposed between, and bonded to, a recessed surface 115 of the cleat and the pressure plate. As shown in FIGS. 12 and 14, the lateral sides of the cushion 113 have a clearance with all adjacent structure and the cushion is accordingly free to expand laterally when compressed in the vertical direction by engagement therewith and then upward movement of the hook portion 58D.

The lever 55D differs from the levers of the earlier embodiments by a shorter torque-receiving arm 69D adapting the lever for use with a short-stroke hydraulic cylinder.

The upper linkage 48D is similar to linkage 48 of Embodiment A except for cross-ties 85D and 118. The cross-tie 85D is angularly spaced from the arm 69D with respect to the axis of the pin 57 by an angle allowing movement of the lever out of underlying relation with the stop 110. Cross-tie 118 is disposed adjacent the outboard side of the lever arm 69D to permit the lever and the linkage to engage in driving relationship in the event the swingable assembly of the device must be forcibly returned to its lower position. Cross-tie 118 is spaced with respect to cross-tie 85D to permit the desired range of movement of the lever necessary to disengage the latter from the stop 110. Both cross-ties function also to reinforce the linkage 48D.

An additional cushioning mechanism differentiates the guide member 43D from its counterparts in the previously described embodiments primarily by an upper housing portion providing slots 121 and 122 for receiving opposite end portions of the pin 49, and a box-shape housing 124 containing a cushioning unit 125. The unit 125 comprises a resilient block 127 and a follower 128. The follower is semi-cylindrically recessed along the face thereof facing away from the block 127 to fit complementarily on a hub portion 129 of the linkage 48D concentrically supported on the pin 49. The length of the unit 125 is such as to cause it to be compressibly confined between an inner end surface 121 of the housing 124 and an outer semi-cylindrical surface of the hub 129.

As illustrated, the longitudinal axes of the slots 121 and 122 are approximately concentric to the axis of the pin 53 at the lower pivot of the member 43D. The unit 125 and the housing 124 are disposed symmetrically with respect to a plane containing the axis of the pin 49 and in chordal relation with the axis of the pin 53.

Thus, the mechanism of the device 17D described above affords two distinct types of cushioning action which may occur one without the other or simultaneously. In the one type of action which involves the stop 110 and compression of the resilient block 113 thereof, the member 43D moves directly upward in a pantographic movement of the assembly comprising the linkages 48D and 51, and the member 43D. In the other type of cushioning action, the member 43D is pivoted counterclockwise, as viewed in FIG. 12, about the axis of the pin 53. Such movement results in movement of the upper end of the member inboardly, or toward the frame member 18 of the hoisting implement. The cushion blocks 113 and 127 act in either case to quickly restore the device to original position as illustrated in FIG. 12 by movement of the member 43 in clockwise direction. Separate or simultaneous operation of both types of cushioning mechanism just described thus enables the device of this invention to absorb impacts in any direction normally encountered in coupling a cargo container and an implement on which such device is mounted.

The terms and expressions which have been employed are used as terms of description and not of limitation and there is no intention of excluding such equivalents of the invention described or of the portions thereof as fall within the purview of the claims.

What is claimed is:

1. A guide device for facilitating the coupling of a cargo-hoisting implement with a load article comprising: support means adapted for attachment of the device to the implement; a vertically elongate guide member for engaging said article; and spaced collateral upper and lower link means supporting said member swingably with respect to the support means, spaced portions of each link means pivotally connected with the support means and the member along separate pivot axes; said member being swingable on said link means from a lateral position to an overhead position in relation to the support means.

2. The device of claim 1 comprising: stop means for limiting the movement of said member to an ambit defined by said positions, said stop means comprising cooperative portions, one portion carried on an assembly comprising said link means and said member and another portion supported in fixed relation with the supporting means.

3. The device of claim 1 comprising: an operating lever movable, and operatively connected, with an assembly comprising said link means and the member for impelling the member from said lower position to said upper position; and locking means comprising cooperative portions, one portion carried on said assembly and another portion mounted in fixed relation with the support means, said portions of the locking means engageable at approximately said lower position, one of said portions of the locking means being movable relative to the remainder of the device at said lower position for withdrawal from locking relation with the other portion; said one portion being operatively connected with the lever; said lever being connected with the assembly movably relative thereto to an extent allowing movement of said one portion of the locking means out of said locking relationship before movement of the assembly out of said lower position.

4. The device of claim 3 wherein: one of said portions of the locking means comprises resilient means for absorbing forces transmitted by said assembly to the locking means at said lateral position of the member.

5. The device of claim 3 wherein: one of said portions of the locking means comprises resilient means for absorbing forces transmitted by said assembly to the locking means when said portions are in opposed relationship at said lower position of the member; and comprises a pivotal joint loosely connecting one of said link means portions pivotably connected with the member and the support means to permit a desired range of tilting movement of the member toward and away from the support means at said lateral position of the member; said joint comprising a resilient element yieldably urging the lower end of the member toward a vertical plane passing through the support means.

6. The device of claim 1 comprising: an operating lever pivoted with respect to one of said link means along an axis in interjacent and coextensive relation with the pivotal axes along which said one link means is connected with the member and support means; means for locking the member in said lower position comprising an upwardly-facing latch portion carried on said lever, and a downwardly-facing detent portion supported in fixed relation with the support means in superjacent relation with the latch portion at said lower position of the member.

7. A device of claim 6 wherein: said upper link means comprises a pair of spaced links extending collaterally between its pivotal axes, and axle means coaxial with said interjacent axis for supporting said lever rotatably with respect to said links; said upper link means comprising a detent spaced angularly with respect to the interjacent axis from the lever at locking position to be engaged thereby upon such rotation of the lever relative to the link means as to withdraw said latch portion from underneath said detent portion.

8. The device of claim 7 wherein: said member has an upwardly extending article-engaging surface facing toward a vertical plane passing through said support means; the pivotal axes of both link means in the support means and the member are parallel and occur at corners of a parallelogram; the axis of the upper link means and the support being horizontally, inwardly offset with respect to the axis of said lower link means and the support.

9. The device of claim 6 wherein: said detent portion comprises resilient means.

10. The device of claim 1 comprising: a pivotal joint loosely effecting said connection of one of said link means portions along one of said axes by which the link means are pivotally connected with the member and the support means to permit limited tilting movement of the member toward and away from the support means at said lateral position of the member; said joint comprising a resilient element yieldably urging the lower end of the member toward a vertical plane passing through the support means.

11. A guide device providing a retractable guide for facilitating the coupling of a cargo-hoisting implement with a load article comprising: support means adapted for attachment to the implement to dispose the device generally along a side thereof, said support means having parallel upper and lower horizontally extending pivot axes; a vertically-elongate guide member having parallel upper and lower horizontally extending pivot axes parallel to said axes of the support means; an upper link means having spaced portions connected in pivotal relation with the support means and the member at said upper axes; and lower link means having spaced portions connected in pivotal relation with the support means and the member at said lower axes; said member swingable on said link means from a downward laterally spaced position to an overhead laterally retracted position relative to the support means in the normally mounted position of the device.

12. The device of claim 11 wherein: said member comprises an upper section providing a vertical article-engaging surface facing toward a plane passing vertically through said support means, and a lower foot section extending from the lower end of said upper section in a direction downwardly and away from said plane.

13. The device of claim 11 wherein: said member comprises an upper section providing an article-engaging surface facing toward a plane passing vertically through said support means, and a foot section having an upper end portion pivotally connected to a lower end portion of said upper section along an axis parallel to said axes; one of said link means being extended on the side of said member away from the support means; said foot section at said lower position of the member extending downwardly and outwardly from its pivotal axis away from said vertical plane; and a link pivotally connected to said link means extension and said foot section at said axes in spaced relation with said upper section; the length of said link and the axes for connecting the link with said foot section and extension being arranged to tilt the foot section upwardly relative to its pivotal axis with said upper section as said member is raised to its upper position.

14. The device of claim 11 comprising: a pivotal joint connecting the member and the upper link means at the outer one of said upper axes; said joint comprising a pin extending along said axis through the upper link means and the member, the link means having slots in which said pin is received extending laterally outwardly approximately along an arc concentric to said lower pivot axis of the member and the lower link means, the pin being movable within the slots relative to the member; and a resilient element housed in a portion of the member laterally outwardly from said pin and acting between the pin and the member to maintain the pin at the ends of the slots nearer the support means.

15. In combination with a cargo-hoisting implement having a peripheral frame element providing a top surface and outward-facing lateral surface, a guide device for facilitating the coupling of the implement with a load article comprising: support means attached to said frame element; a guide member having a vertically elongate lateral surface facing toward a generally vertical plane extending lengthwise along said lateral surface; and spaced collateral upper and lower link means supporting said member outboardly and swingably with respect to the support means and said implement; said upper and lower link means being connected inboardly of respective lengths at upper and lower pivotal axes, respectively, extending through said support means, and outboardly through upper and lower pivotal axes, respectively, extending through said member; all of said axes being approximately horizontal and parallel; said member and said link means having lengths and being arranged to enable said member to be swingable on said link means from a downwardly and laterally offset position to an overhead position in relation to said top surface.

16. The combination of claim 15 wherein: the upper axis of the support means and the upper link means is horizontally offset relative to the lower axis of the support means and the lower link means to dispose said upper axis in overhead relation with said upward facing surface of the element.

17. The combination of claim 16 comprising: an operating lever pivoted with respect to said upper link means along an axis in interjacent and coextensive relation with the pivotal axes thereof with the member and support means, said interjacent axis being in direct overhead relation with said lower axis of the support means; said interjacent axis and lower axis being adjacent the plane of said lateral surface of the frame element; means for locking the member in said lower position comprising: an upwardly facing latch portion carried on said lever, a downwardly facing detent portion supported in fixed relation with the frame element and extending laterally outwardly from said lateral surface thereof in superjacent relation with the latch portion at said lower position of the member; said implement arranged for rotation of the lever into overhead relation with said frame element.

18. In combination, a cargo container of which its upper surface provides its maximum horizontal contour, a hoisting implement of maximum horizontal contour similar in shape but smaller than that of the container, means coupling the container and the implement together with a uniform margin of the upper surface projecting laterally beyond the implement, and a plurality of guide devices mounted on said implement for facilitating coupling thereof with the container, each guide device comprising: support means attached to a peripheral frame element of the implement; the guide member having a vertically elongate lateral surface facing toward a vertical plane passing through said support means; and spaced collateral upper and lower link means supporting said members outboardly and swingably with respect to the support means and said implement; said upper and lower link means being connected by laterally inward end portions at upper and lower pivotal axes, respectively, extending through said support means, and outboardly through upper and lower pivotal axes, respectively, extending through said member; all of said axes being approximately parallel to the horizontal length of the associated frame element; the members of said devices being swingable on respective link means from downwardly and laterally offset positions relative to the implement and exteriorly of the periphery of said container when coupled with the implement to overhead positions relative to the implement.

References Cited in the file of this patent

UNITED STATES PATENTS

| | | |
|---|---|---|
| 2,212,064 | Elliot | Aug. 20, 1940 |
| 2,847,245 | Leslie | Aug. 12, 1958 |

FOREIGN PATENTS

| | | |
|---|---|---|
| 450,902 | Great Britain | July 27, 1936 |
| 632,331 | Great Britain | Nov. 21, 1949 |